G. W. BISHOP & D. B. SHERMAN.
Combined Hay Tumbler and Rakes.

No. 162,457. Patented April 27, 1875.

UNITED STATES PATENT OFFICE.

GEORGE W. BISHOP AND DAVID B. SHERMAN, OF CASTLETON, VERMONT; SAID BISHOP ASSIGNOR TO FAYETTE BARNEY, OF SAME PLACE.

IMPROVEMENT IN COMBINED HAY TUMBLERS AND RAKES.

Specification forming part of Letters Patent No. 162,457, dated April 27, 1875; application filed April 5, 1875.

*To all whom it may concern:*

Be it known that we, GEORGE W. BISHOP and DAVID B. SHERMAN, of Castleton, in the county of Rutland and State of Vermont, have invented certain new and useful Improvements in Combined Hay Tumblers and Rakes; and we do hereby declare that the following is a full, clear, and exact description thereof, which will enable others skilled in the art to which it pertains to make and use the same, reference being had to the accompanying drawings, and to the letters of reference marked thereon, which form a part of this specification.

Our invention consists in providing an ordinary hand-rake head with two rows of teeth or tines, one of which rows projects backward at a somewhat acute angle with the handle E, forming a rake, while the other row of teeth projects forward at an obtuse angle with the row of rake-teeth, and is for the purpose of tumbling or pitching hay.

Figure 1:
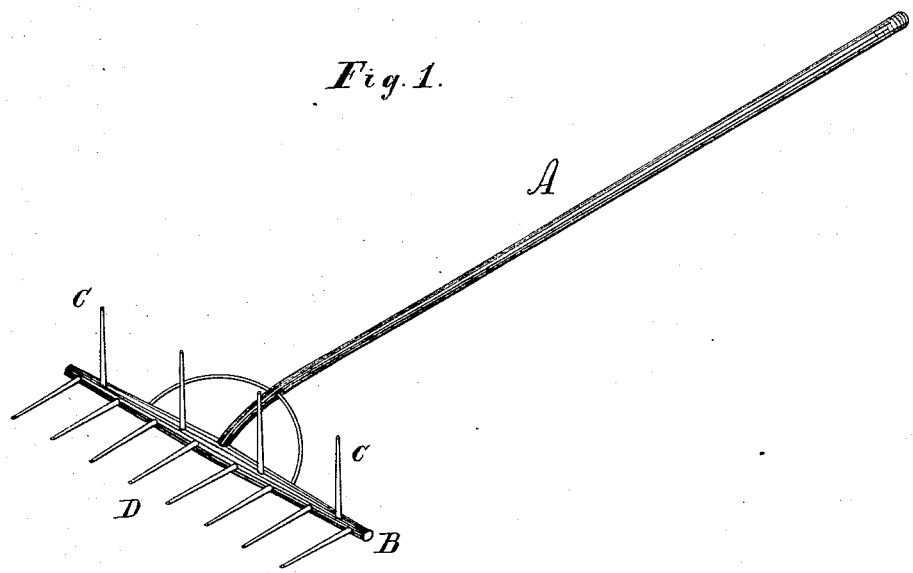
Figure 2:
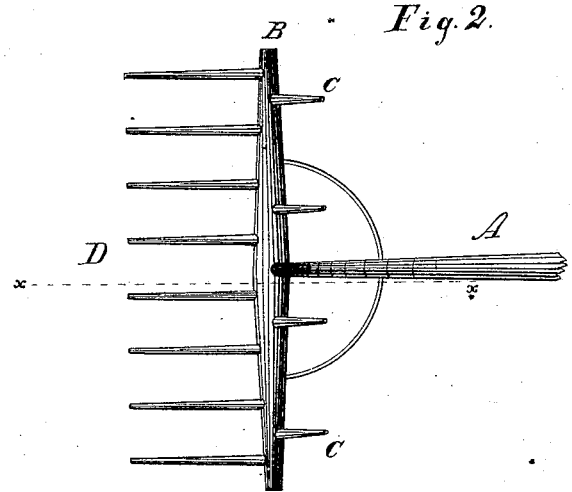
Figure 3:
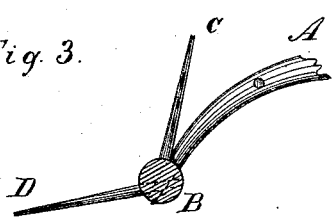

In the drawing, Figure 1 is a perspective view of our invention, and Fig. 2 is a plan view. Fig. 3 is a section taken on line $x$ $x$ in Fig. 2.

A is the handle; B, the head; C, the row of rake-teeth, and D the row of tumbler-teeth.

In tumbling or pitching hay the implement is held in the position shown in Fig. 1 of the drawing; and when it is necessary to rake after, or gather the hay together, the handle A needs only to be turned in the hand, so that the row of rake-teeth C shall project downward, when it is ready for use as a rake.

It is frequently necessary, as is well known, while tumbling hay which is in process of curing in the meadow, in making up hay-cocks, and in loading wagons with hay, to lay down the tumbler or fork, and take up a rake for the purpose of gathering the hay; and the object of our invention is to obviate the inconvenience and loss of time attendant upon this alternate use of two separate implements.

The angle at which the rows of teeth are arranged with relation to each other and the handle may be varied—as, for instance, the rake-teeth may be set at a right angle to the handle, and then the tumbler-teeth should be set in a plane at a right angle to that of the row of rake-teeth. Instead of being straight, the teeth in either or both rows may be curved.

We are aware that a patent was granted to H. F. Morton, dated March 30, 1869, for an improvement in drag-rakes having two rows of teeth in the rake-head, and also that a patent for an improvement in drag-rakes was granted to G. H. Hackett, January 18, 1870, in which is shown a similar arrangement of teeth; and we hereby disclaim the inventions covered by those patents; but

Having now fully described the construction and manner of using our invention, we claim—

As a new article of manufacture, the combined hay tumbler and rake, consisting of the head B, having the two rows of teeth C and D arranged therein at suitable angles with each other, and a handle, A, substantially as described and shown.

In testimony that we claim the foregoing as our own invention we affix hereto our signatures in presence of two witnesses.

GEORGE W. BISHOP.
DAVID B. SHERMAN.

Witnesses:
LUTHER S. PROUTY,
JOHN H. LANGDON.